US010720826B1

(12) United States Patent
Yang et al.

(10) Patent No.: US 10,720,826 B1
(45) Date of Patent: Jul. 21, 2020

(54) TWO DEGREE-OF-FREEDOM ACTUATOR

(71) Applicant: HONEYWELL INTERNATIONAL INC., Morris Plains, NJ (US)

(72) Inventors: Qiang Yang, Shanghai (CN); Zhijun Dai, Shanghai (CN); Yonghui Zhang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/291,204

(22) Filed: Mar. 4, 2019

(51) Int. Cl.
H02K 41/035 (2006.01)
F16M 11/12 (2006.01)
G03B 17/56 (2006.01)
F16M 11/18 (2006.01)

(52) U.S. Cl.
CPC ......... H02K 41/0358 (2013.01); F16M 11/12 (2013.01); F16M 11/18 (2013.01); G03B 17/561 (2013.01); H02K 2201/18 (2013.01)

(58) Field of Classification Search
CPC ............................ H02K 2201/18; F16M 11/18
See application file for complete search history.

(56) References Cited

U.S. PATENT DOCUMENTS

| 4,236,414 A * | 12/1980 | Rodgers | ................ | F41G 7/2213 248/583 |
| 5,064,285 A * | 11/1991 | Iddan | .................... | F41G 7/2213 356/139.05 |
| 6,909,205 B2 | 6/2005 | Corcoran et al. | | |
| 7,034,283 B2 * | 4/2006 | Williams | ............. | G01D 5/2495 250/231.16 |
| 9,287,760 B2 * | 3/2016 | Pasternak | ............ | H02K 41/031 |
| 9,893,574 B2 | 2/2018 | Bandera | | |
| 2009/0207239 A1 * | 8/2009 | Warmerdam | ........ | H02K 41/031 348/61 |
| 2019/0379268 A1 * | 12/2019 | Adams | ................. | G03B 17/561 |

FOREIGN PATENT DOCUMENTS

| EP | 3249794 A2 | | 11/2017 |
| JP | 04104666 A | * | 4/1992 |
| JP | 2010078842 A | * | 4/2010 |

* cited by examiner

Primary Examiner — Clayton E. LaBalle
Assistant Examiner — Leon W Rhodes, Jr.
(74) Attorney, Agent, or Firm — Lorenz & Kopf, LLP

(57) ABSTRACT

A two degree-of-freedom actuator includes a first linkage, a second linkage, a third linkage, a magnet, a winding panel, and a plurality of windings. The second linkage is rotationally coupled to the first linkage, whereby the first linkage is rotatable, relative to the second linkage, about a first rotational axis. The third linkage is rotationally coupled to the second linkage, whereby the first and second linkages are rotatable, relative to the third linkage, about a second rotational axis that is perpendicular to the first rotational axis. The magnet is fixedly mounted on the first linkage. The winding panel is fixedly mounted to the third linkage and has an inner surface and an opposing outer surface. The inner surface faces the magnet and is spaced apart therefrom. The windings are wound around the winding panel.

20 Claims, 8 Drawing Sheets

TWO DEGREE-OF-FREEDOM ACTUATOR

TECHNICAL FIELD

The present invention generally relates to electromagnetic actuators, and more particularly relates to a two degree-of-freedom actuator.

BACKGROUND

In recent years, unmanned autonomous vehicle (UAV), robotic, and surveillance camera industries have grown relatively quickly. Many devices within these industries rely on DC motors effectuate various motions. In the context of UAVs that include a camera, actuators are used to move the camera, in two degrees-of-freedom, to a specific position and to remain stable in that position when the UAV is moving. Currently, motion in each degree-of-freedom is implemented using a separate DC motor.

Various attempts have been made to develop electromagnetic machines (e.g., motors/actuators) that can rotate in multiple degrees-of-freedom. The electromagnetic machines heretofore developed suffer certain drawbacks. For example, the machines can be relatively large and relatively expensive to manufacture, and can be relatively complex.

Hence, there is a need for multi-degree-of-freedom actuator that is relatively small and inexpensive, as compared to known designs, and that can independently or synchronously generate torque and/or rotate along two perpendicular axes. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a two degree-of-freedom actuator includes a first linkage, a second linkage, a third linkage, a magnet, a winding panel, and a plurality of windings. The second linkage is rotationally coupled to the first linkage, whereby the first linkage is rotatable, relative to the second linkage, about a first rotational axis. The third linkage is rotationally coupled to the second linkage, whereby the first and second linkages are rotatable, relative to the third linkage, about a second rotational axis that is perpendicular to the first rotational axis. The magnet is fixedly mounted on the first linkage. The winding panel is fixedly mounted to the third linkage and has an inner surface and an opposing outer surface. The inner surface faces the magnet and is spaced apart therefrom. The windings are wound around the winding panel.

In another embodiment, a two degree-of-freedom actuator includes a first linkage, a second linkage, a third linkage, a magnet, a winding panel, a first winding, and a second winding. The second linkage is rotationally coupled to the first linkage, whereby the first linkage is rotatable, relative to the second linkage, about a first rotational axis. The third linkage is rotationally coupled to the second linkage, whereby the first and second linkages are rotatable, relative to the third linkage, about a second rotational axis that is perpendicular to the first rotational axis. The magnet is fixedly mounted on the first linkage. The winding panel is fixedly mounted to the third linkage and has an inner surface, and outer surface, a first edge, a second edge, a third edge, and a fourth edge. The inner surface faces the magnet and is spaced apart therefrom. The first winding is wound around the winding panel in a first winding direction, and the second winding is wound around the winding panel in a second winding direction, and the first and second windings are disposed perpendicular to each other.

In yet another embodiment, a two degree-of-freedom actuator includes a first linkage, a second linkage, a third linkage, a magnet, a winding panel, a plurality of windings, and a control. The second linkage is rotationally coupled to the first linkage, whereby the first linkage is rotatable, relative to the second linkage, about a first rotational axis. The third linkage is rotationally coupled to the second linkage, whereby the first and second linkages are rotatable, relative to the third linkage, about a second rotational axis that is perpendicular to the first rotational axis. The magnet is fixedly mounted on the first linkage. The winding panel is fixedly mounted to the third linkage and has an inner surface and an opposing outer surface. The inner surface faces the magnet and is spaced apart therefrom. The windings are wound around the winding panel. The control is coupled to, and is configured to selectively energize, the plurality of windings to thereby generate a force that causes rotation of one or both of the first and second linkages.

Furthermore, other desirable features and characteristics of the multi-degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
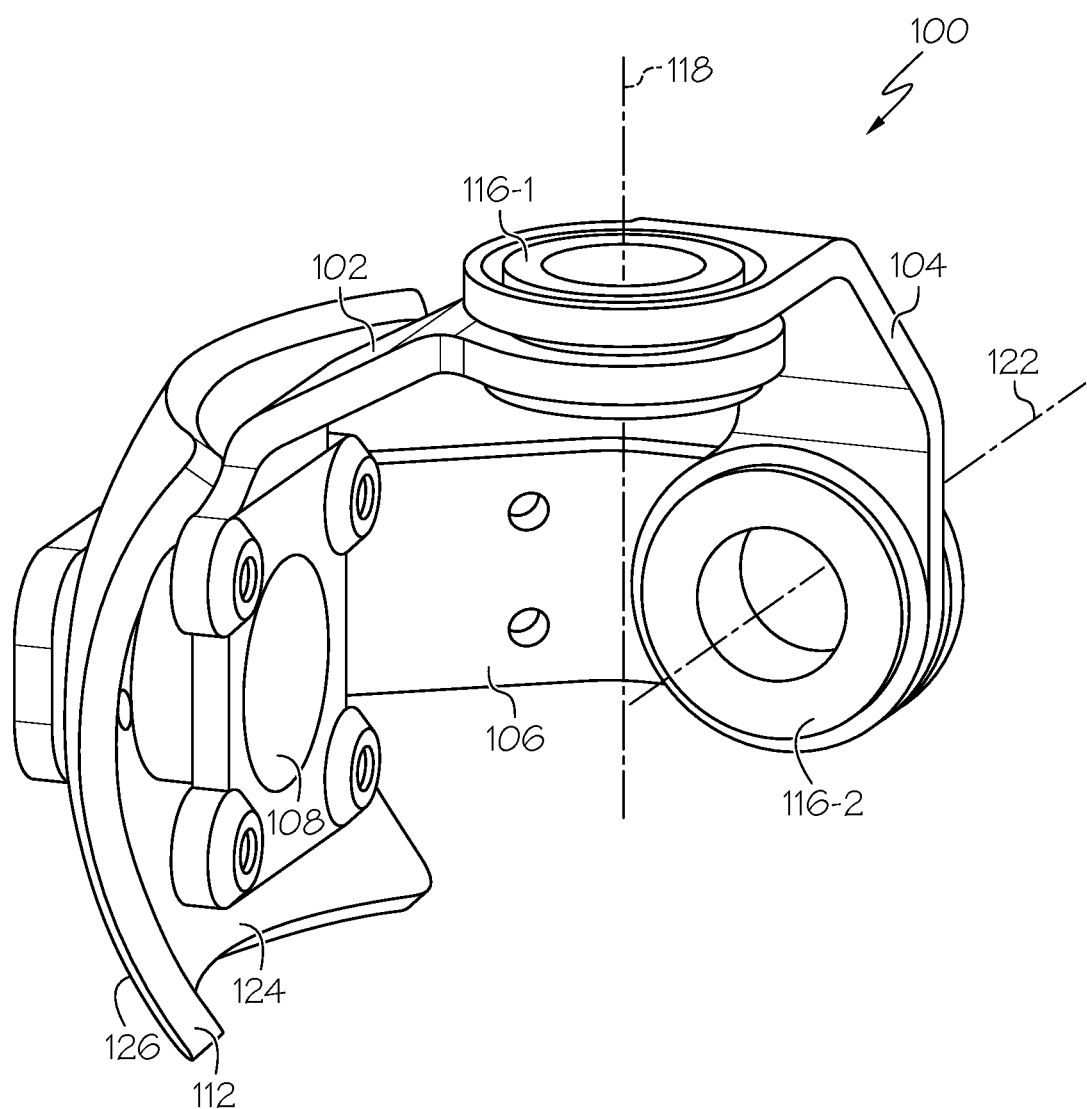
FIGS. 1 and 2 depict plan and exploded views, respectively, of one embodiment of a two degree-of-freedom actuator.
Figure 2:
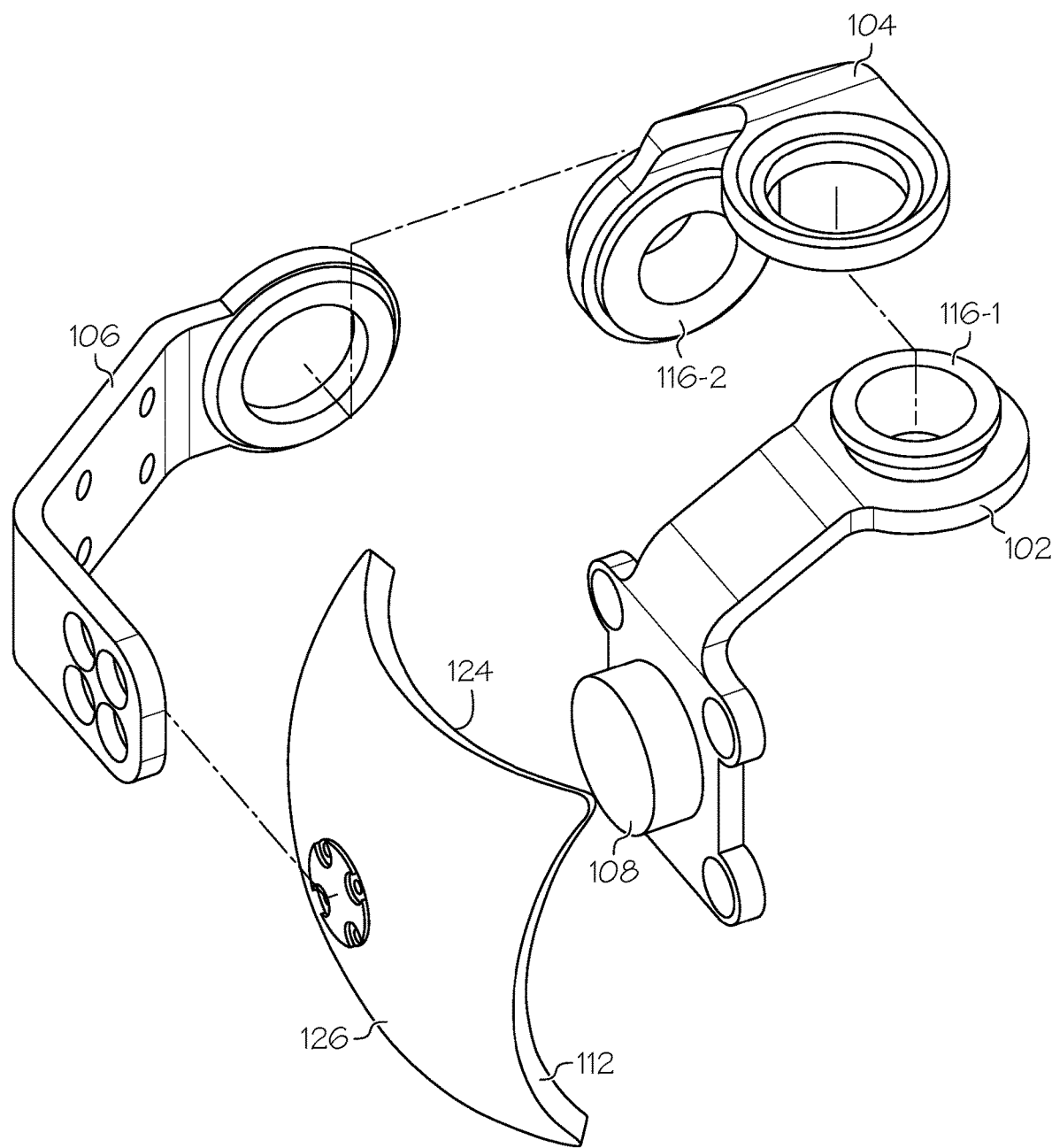

Referring first to FIGS. 1 and 2, a plan view and exploded view, respectively, of one embodiment of a two degree-of-freedom actuator 100 is depicted. The actuator 100 includes at least a first linkage 102, a second linkage 104, a third linkage 106, a magnet 108, a winding panel 112, and a plurality of windings 114 (not visible in FIGS. 1 and 2). As will be described further below the actuator 100 may also be coupled to, and controlled, by a suitably configured controller 110.

The first linkage 102 and the second linkage 104 are rotationally coupled together, and the second linkage 104 and the third linkage 106 are also rotationally coupled together. The rotational coupling of the first and second linkages 102, 104 and of the second and third linkages 104, 106 may be facilitated using any one of numerous techniques. In the depicted embodiment, the rotational coupling is facilitated using bearing assemblies 116—a first bearing assembly 116-1 and a second bearing assembly 116-2. It will be appreciated that the bearing assemblies 116 may be implemented using any one of numerous suitable types of bearing assemblies.

Regardless, of the specific type of rotational coupling that is used, the rotational coupling results in the first linkage 102 being rotatable, relative to the second linkage 104, about a first rotational axis 118. And the second linkage 104 being rotatable, relative to the third linkage 106, about a second rotational axis 122 that is perpendicular to the first rotational axis 118.

The magnet 108 is fixedly mounted on the first linkage 102, and the winding panel 112 is fixedly mounted to the third linkage 106 via suitable mounting hardware 107. In the depicted embodiment, the magnet 108 is implemented using a permanent magnet. In other embodiments, however, the magnet 108 may be implemented using an electromagnet. The winding panel 112 has an inner surface 124 and an opposing outer surface 126. The winding panel 112 is disposed such that the inner surface 124 faces, and is apart from, the magnet 108. The magnet 108 is preferably configured and disposed such that one of its magnetic poles is facing toward the inner surface 124 of the winding panel 112 and the other of its magnetic poles faces away from the inner surface 124 of the winding panel 112. When the magnet 108 is implemented using an electromagnet, it is preferably energized such that one of its magnetic poles is facing toward the inner surface 124 of the winding panel 112 and the other of its magnetic poles faces away from the inner surface 124 of the winding panel 112.

Figure 3:
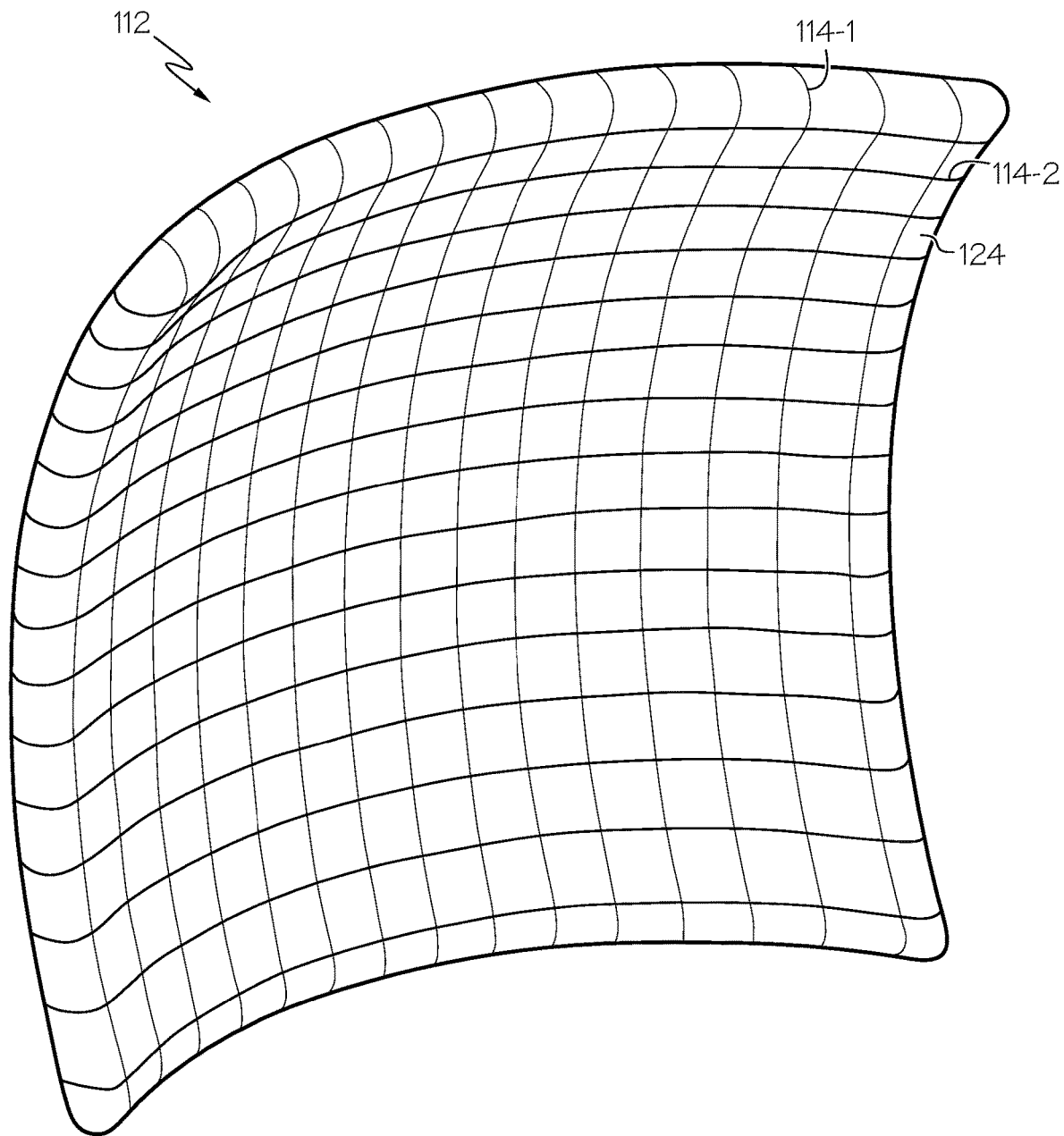
FIG. 3 depicts a view of one embodiment of a winding panel with windings wound thereon.

The plurality of windings 114 are wound around the winding panel 112. It will be appreciated that the number of windings 114 and the configuration of the windings 114 on the winding panel 112 may vary. In the depicted embodiment, and as FIG. 3 depicts, the windings 114 are implemented using a first winding 114-1 and a second winding 114-2. Moreover, the first winding 114-1 is wound around the winding panel 112 in a first winding direction, and the second winding 114-2 is wound around the winding panel 112 in a second winding direction, such that the first 114-1 and second 114-2 windings are disposed perpendicular to each other. It is further noted that in the depicted embodiment the first and second windings 114-1, 114-2 each consist of a single strand of wire. This, however, is merely an example of one embodiment and that the first and second windings 114-1, 114-2 could consist of multiple wire strands.

Figure 4:
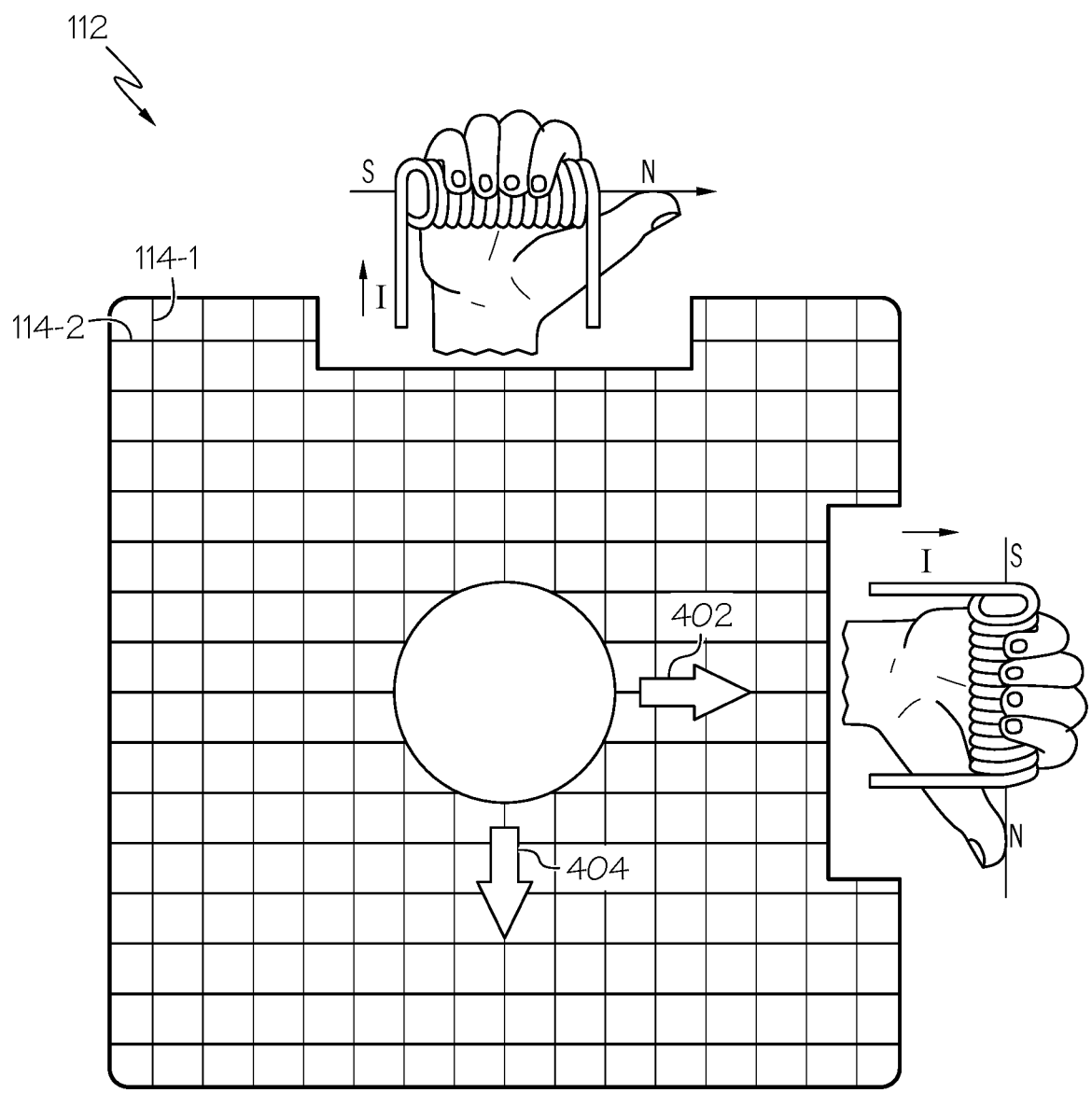
FIG. 4 provides a simplified illustration of the controlled movement of the magnet that is used in the actuator of FIG. 1.

With the above-described configuration, when the windings 114 are energized, an electromagnetic force is generated that causes one or both of the first and second linkages 102, 104 to rotate. More specifically, when current is supplied to one or both of the first and second windings 114-1, 114-2, the resultant magnetic flux will interact with the magnetic field of the magnet 108, generating an electromagnetic force that causes the magnet 108 to move. For example, as FIG. 4 depicts, when current is supplied to the first winding 114-1 in the direction indicated using the well-known right-hand-rule, the magnet 108 will move to in the direction indicated by arrow 402, and when current is supplied to the second winding 114-2 in the direction indicated using the well-known right-hand-rule, the magnet 108 will move to in the direction indicated by arrow 404. It will be appreciated that the movement directions 402, 404 would be in the respective opposite directions if the directions of current were opposite the directions indicated. It will additionally be appreciated that the movement directions 402, 404 indicated are associated with the configuration of when the south pole (S) of the magnet 108 is facing the winding panel 112. If the magnet 108 is disposed such that its north pole (N) is facing the winding panel 112, the movement directions would be opposite of those indicated in FIG. 4.

Figure 5:
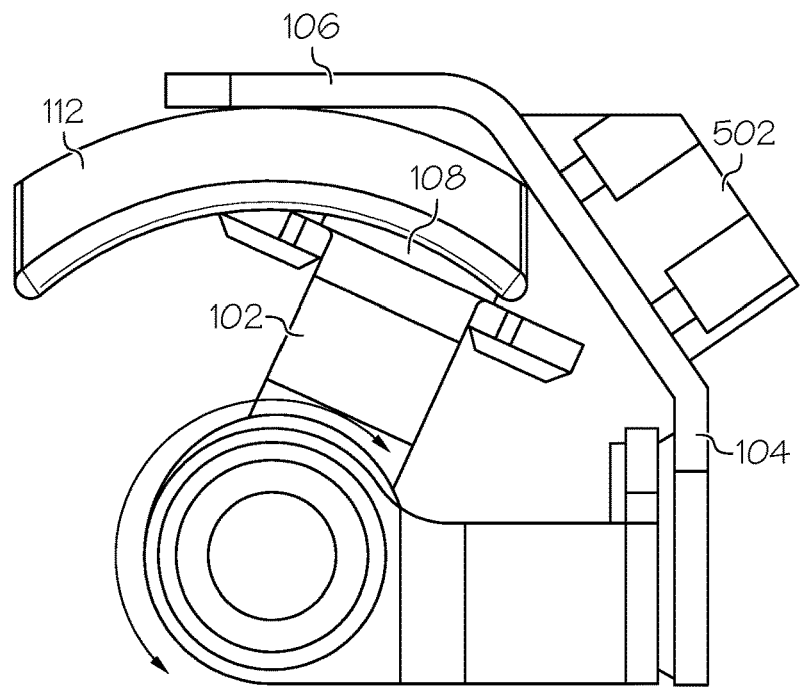
FIGS. 5-7 illustrate the controlled movement of the linkages that are used in the actuator of FIG. 1.
Figure 6:
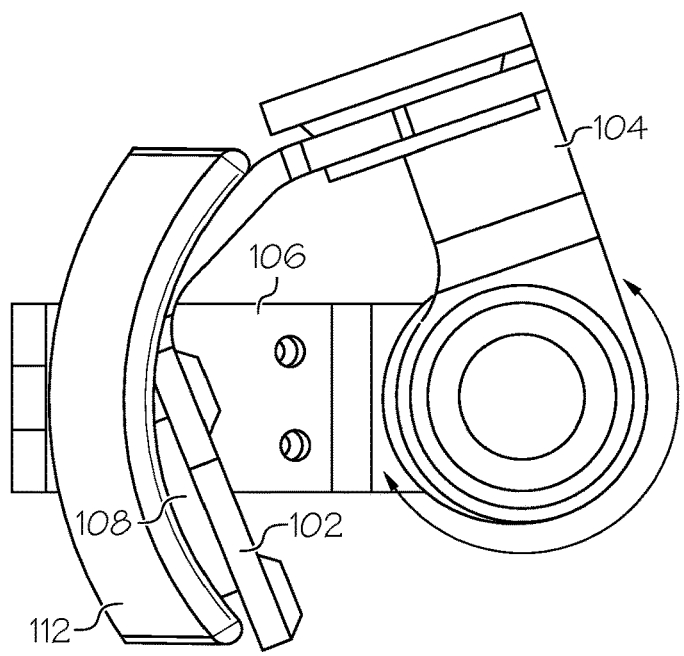
Figure 7:
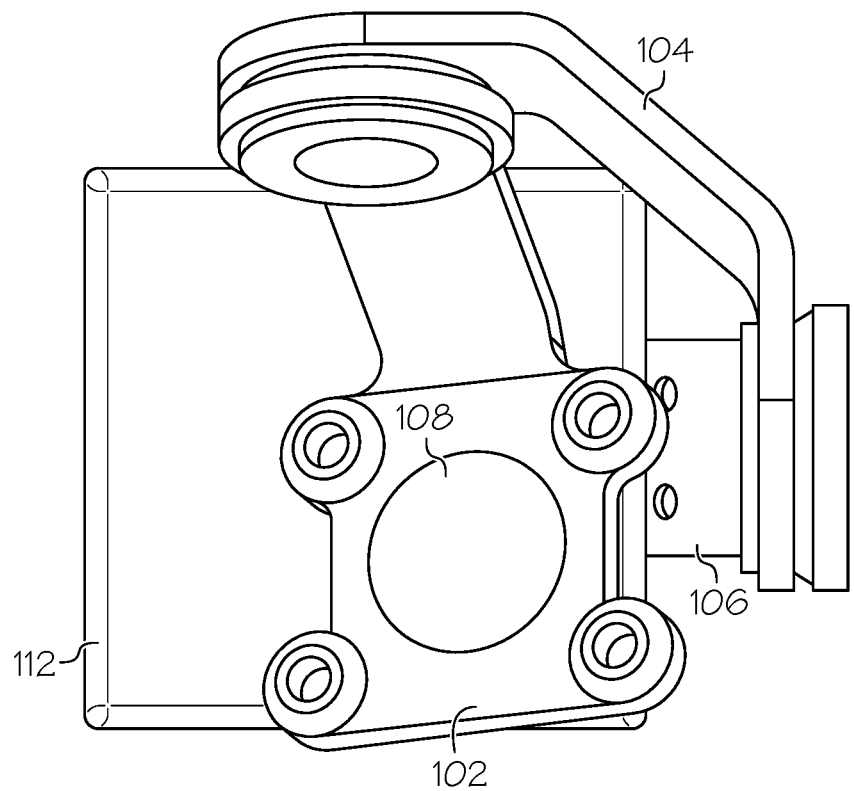

When being implemented for use, the third linkage 106 is fixedly coupled, against rotation, to a structure 502 (see FIG. 5). Thus, because the magnet 108 is fixedly mounted on the first linkage 102, and because the third linkage 106 does not rotate, movement of the magnet 108 is constrained to rotation about the first and second rotational axes 118, 122. This is illustrated in FIGS. 5-7. In particular, FIG. 5 depicts rotation of the magnet 108, and thus the first linkage 102, about the first rotational axis 118, FIG. 6 depicts rotation of the magnet 108, and thus the first and second linkages 102, 104, about the second rotational axis 122, and FIG. 7 depicts rotation of the magnet 108, and thus the first and second linkages 102, 104, about the first and second rotational axes 118, 122.

Before proceeding further, it is noted that the movement envelope of the first and second linkages 102, 104 may be varied by varying the dimensions of the winding panel 112. Moreover, the force that drives the magnet 108, and thus the first and second linkages 102, 104, may be varied by varying the current magnitude in the windings 114 or varying the number of windings on the winding panel 112.

Figure 8:
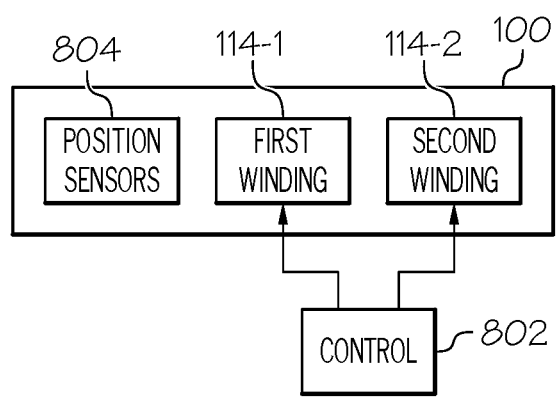
FIG. 8 depicts a functional block diagram of a control system.

Referring now to FIG. 8, a functional block diagram of a two degree-of-freedom control system 800 that includes the two degree-of-freedom actuator 100 of FIGS. 1-7 is depicted. As FIG. 8 depicts, the system 800 includes a control 802 that is coupled to each of the windings 114. The control 802 is configured to selectively energize the first and second windings 114-1, 114-2 to thereby generate the force that causes rotation of one or both of the first and second linkages 102, 104. The control 802 is further configured to control the magnitude and direction of the current supplied to the first and second windings 114-1, 114-2.

The control 802 may be configured to implement its functionality using either closed-loop control or open-loop control. Closed-loop control provides higher accuracy and precision, higher bandwidth, and autonomous control. Various control techniques could be implemented in the control 802. Open-loop control provides relatively lower cost, less complexity, relatively simple DC operation, and relatively lower size and weight.

Figure 9:
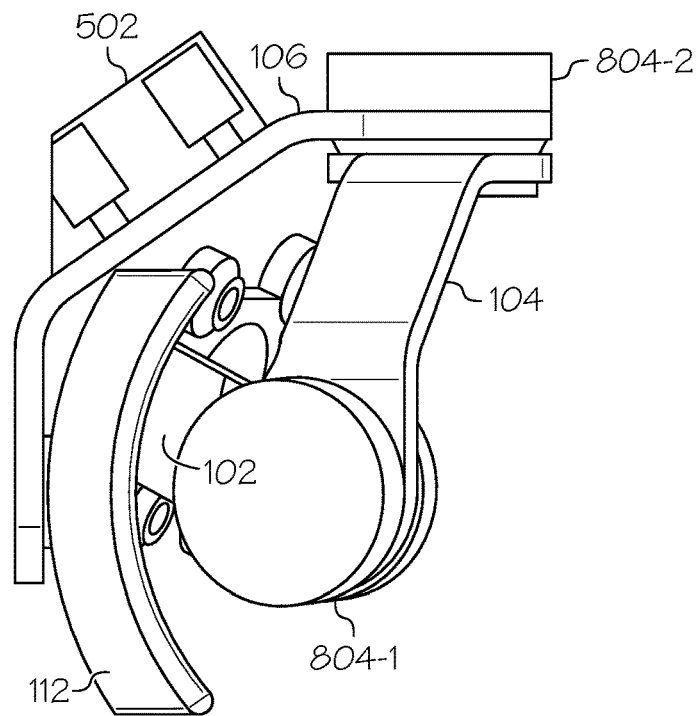
FIG. 9 depicts the actuator of FIG. 1 with position sensors coupled thereto.

If the control 802 implements closed-loop control, then the control system 800 preferably includes one or more position sensors 804. Preferably, as depicted in FIG. 9, the actuator 100 preferably includes two position sensors 804—a first position sensor 804-1 and a second position sensor 804-2. The first position sensor 804-1 is configured to sense the rotational position of the first linkage 102 about the first rotational axis 118 and to supply a first sensor signal representative thereof to the control 802. The second position sensor 804-2 is configured to sense the rotational position of the second linkage 102 about the second rotational axis 112 and to supply a second sensor signal representative thereof to the control 802. The position sensors may be implemented using any one of numerous optical sensors, track balls, rotary sensors, or the like.

Figure 10:
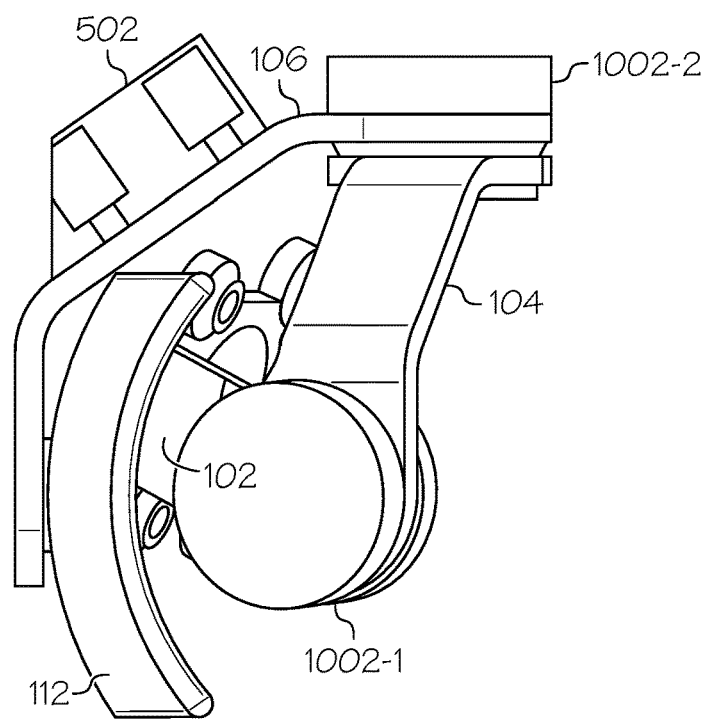
FIG. 10 depicts the actuator of FIG. 1 with feedback springs coupled thereto.

If the control 802 implements open-loop control, then the actuator 100 may include a plurality of springs to provide force feedback. As illustrated in FIG. 10, the actuator 100 may include a first spring 1002-1 and a second spring 1002-2 coupled to the first linkage 102 and the second linkage 104, respectively. The electromagnetic force acting on the magnet 108 is directly related to the current flowing in the windings 114, and this force drives the movement of the first and second linkages 102, 104 and thus compression of the first and second springs 1002-1, 1002-2. The resultant of force will be zero when the forces are equal, and the position of the magnet 108 can be controlled by controlling the current in the windings 114.

Figure 11:
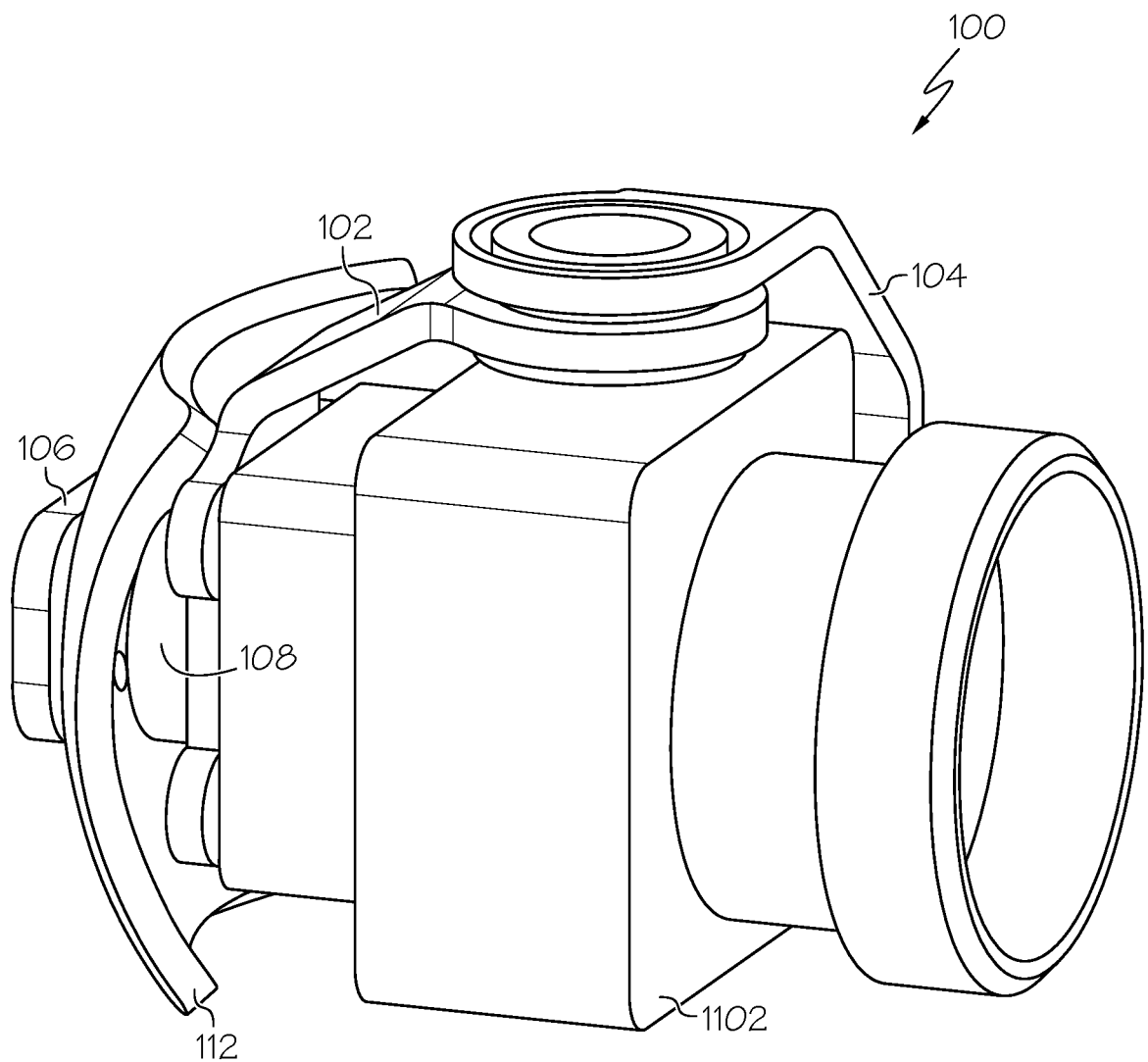
FIG. 11 depicts the actuator of FIG. 1 with a device coupled thereto.

The actuator 100 may be used to controllably position a device. For example, as FIG. 11 depicts, a device 1102, such as a camera (depicted in phantom in FIG. 11), may be fixedly coupled to the first linkage 102 and rotatable therewith. Thus, the device 1102 may be controllably positioned in two degrees-of-freedom.

The two degree-of-freedom actuator 100 described herein is relatively small and inexpensive, as compared to known designs, and can independently or synchronously rotate along two perpendicular axes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A two degree-of-freedom actuator, comprising:
   a first linkage having a first end and a second end;
   a second linkage having a first end and a second end, the first end of the second linkage rotationally coupled to the second end of the first linkage via a first bearing assembly, whereby the first linkage is rotatable, relative to the second linkage, about a first rotational axis;
   a third linkage having a first end and a second end, the first end of the third linkage rotationally coupled to the second end of the second linkage via a second bearing assembly, whereby the first and second linkages are rotatable together, relative to the third linkage, about a second rotational axis that is perpendicular to the first rotational axis;
   a magnet fixedly mounted on the first end of the first linkage;
   a winding panel fixedly mounted to the second end of the third linkage, the winding panel having an inner surface and an opposing outer surface, the inner surface facing the magnet and spaced apart therefrom; and
   a plurality of windings wound around the winding panel.

2. The actuator of claim 1, further comprising:
   a first winding wound around the winding panel in a first winding direction; and
   a second winding wound around the winding panel in a second winding direction,
   wherein the first and second windings are disposed perpendicular to each other.

3. The actuator of claim 2, wherein the first and second windings each consist of a single strand of wire.

4. The actuator of claim 2, further comprising:
   a control coupled to, and configured to selectively energize, the first and second windings to thereby generate a force that causes rotation of one or both of the first and second linkages.

5. The machine of claim 4, wherein the control is further configured to control current magnitudes and directions to the first and second windings.

6. The actuator of claim 5, further comprising:
   a first position sensor coupled to the first linkage, the first position sensor configured to sense a rotational position of the first linkage about the first rotational axis and to supply a first sensor signal representative thereof to the control 802; and
   a second position sensor coupled to the second linkage, the second position sensor configured to sense a rotational position of the second linkage about the second rotational axis and to supply a second sensor signal representative thereof to the control.

7. The actuator of claim 1, further comprising:
   a first spring coupled to the first linkage and configured to supply a first force thereto; and
   a second spring coupled to the second linkage and configured to supply a second force thereto.

8. The actuator of claim 1, further comprising:
   a device fixedly coupled to the first linkage and rotatable therewith.

9. A two degree-of-freedom actuator, comprising:
   a first linkage having a first end and a second end;
   a second linkage having a first end and a second end, the first end of the second linkage rotationally coupled to the second end of the first linkage via a first bearing assembly, whereby the first linkage is rotatable, relative to the second linkage, about a first rotational axis;
   a third linkage having a first end and a second end, the first end of the third linkage rotationally coupled to the second end of the second linkage via a second bearing assembly, whereby the first and second linkages are rotatable together, relative to the third linkage, about a second rotational axis that is perpendicular to the first rotational axis;
   a magnet fixedly mounted on the first end of the first linkage;

a winding panel fixedly mounted to the second end of the third linkage, the winding panel having an inner surface, and outer surface, a first edge, a second edge, a third edge, and a fourth edge, the inner surface facing the magnet and spaced apart therefrom;
a first winding wound around the winding panel in a first winding direction; and
a second winding wound around the winding panel in a second winding direction,
wherein the first and second windings are disposed perpendicular to each other.

10. The actuator of claim 9, wherein the first and second windings each consist of a single strand of wire.

11. The actuator of claim 9, further comprising:
a control coupled to, and configured to selectively energize, the first and second windings to thereby generate a force that causes rotation of one or both of the first and second linkages.

12. The machine of claim 11, wherein the control is further configured to control current magnitudes and directions to the first and second windings.

13. The actuator of claim 12, further comprising:
a first position sensor coupled to the first linkage, the first position sensor configured to sense a rotational position of the first linkage about the first rotational axis and to supply a first sensor signal representative thereof to the control 802; and
a second position sensor coupled to the second linkage, the second position sensor configured to sense a rotational position of the second linkage about the second rotational axis and to supply a second sensor signal representative thereof to the control.

14. The actuator of claim 9, further comprising:
a first spring coupled to the first linkage and configured to supply a first force thereto; and
a second spring coupled to the second linkage and configured to supply a second force thereto.

15. The actuator of claim 9, further comprising:
a camera fixedly coupled to the first linkage and rotatable therewith.

16. A two degree-of-freedom actuator, comprising:
a first linkage having a first end and a second end;
a second linkage having a first end and a second end, the first end of the second linkage rotationally coupled to the second end of the first linkage via a first bearing assembly, whereby the first linkage is rotatable, relative to the second linkage, about a first rotational axis;
a third linkage having a first end and a second end, the first end of the third linkage rotationally coupled to the second end of the second linkage via a second bearing assembly, whereby the first and second linkages are rotatable together, relative to the third linkage, about a second rotational axis that is perpendicular to the first rotational axis;
a magnet fixedly mounted on the first end of the first linkage;
a winding panel fixedly mounted to the second end of the third linkage, the winding panel having an inner surface and an opposing outer surface, the inner surface facing the magnet and spaced apart therefrom;
a plurality of windings wound around the winding panel; and
a control coupled to, and configured to selectively energize, the plurality of windings to thereby generate a force that causes rotation of one or both of the first and second linkages.

17. The actuator of claim 16, further comprising:
a first winding wound around the winding panel in a first winding direction; and
a second winding wound around the winding panel in a second winding direction,
wherein the first and second windings are disposed perpendicular to each other.

18. The machine of claim 17, wherein the control is further configured to control current magnitudes and directions to the first and second windings.

19. The actuator of claim 18, further comprising:
a first position sensor coupled to the first linkage, the first position sensor configured to sense a rotational position of the first linkage about the first rotational axis and to supply a first sensor signal representative thereof to the control 802; and
a second position sensor coupled to the second linkage, the second position sensor configured to sense a rotational position of the second linkage about the second rotational axis and to supply a second sensor signal representative thereof to the control.

20. The actuator of claim 16, further comprising:
a first spring coupled to the first linkage and configured to supply a first force thereto; and
a second spring coupled to the second linkage and configured to supply a second force thereto.

* * * * *